United States Patent [19]
Karakama et al.

[11] Patent Number: 5,233,158
[45] Date of Patent: Aug. 3, 1993

[54] ARC WELDING CURRENT AND VOLTAGE CONTROL METHOD

[75] Inventors: Tatsuo Karakama, Oshino; Eiichi Kobayashi, Hachioji, both of Japan

[73] Assignee: Fanuc Ltd, Yamanashi, Japan

[21] Appl. No.: 674,331

[22] PCT Filed: Aug. 2, 1990

[86] PCT No.: PCT/JP90/00989
  § 371 Date: Apr. 15, 1991
  § 102(e) Date: Apr. 15, 1991

[87] PCT Pub. No.: WO91/03351
  PCT Pub. Date: Mar. 21, 1991

[30] Foreign Application Priority Data

Aug. 29, 1989 [JP] Japan .................. 1-220206

[51] Int. Cl.⁵ ............................................ B23K 9/095
[52] U.S. Cl. ............................ 219/130.33; 219/137.71
[58] Field of Search ....................... 219/130.33, 137.71, 219/137 PS, 124.03, 125.1

[56] References Cited

U.S. PATENT DOCUMENTS

| | | | |
|---|---|---|---|
| 3,538,376 | 11/1970 | Parker | 219/137.71 |
| 4,441,009 | 4/1984 | Toohey | 219/124.03 |
| 4,521,672 | 6/1985 | Fronius | 219/130.33 |
| 4,851,639 | 7/1989 | Sugitani et al. | 219/124.34 |

FOREIGN PATENT DOCUMENTS

| | | |
|---|---|---|
| 3317028 | 11/1984 | Fed. Rep. of Germany ............ 219/137.71 |
| 52-32625 | 8/1977 | Japan . |
| 57-199566 | 12/1982 | Japan . |
| 58-23569 | 12/1983 | Japan . |
| 62-40111 | 8/1987 | Japan . |
| 1-15352 | 3/1989 | Japan . |

Primary Examiner—Clifford C. Shaw
Attorney, Agent, or Firm—Staas & Halsey

[57] ABSTRACT

A control method capable of effecting satisfactory arc welding by automatically controlling arc welding current and voltage. A processor calculates (106, 112) errors ($\epsilon I$, $\epsilon V$) between mean value (I, V) of actual welding currents and voltages periodically detected a predetermined number of times and target values IO, VO) of the welding current and voltage. If the welding current error falls outside an allowable range, a wire feeding speed correction amount is determined ($\Delta FW$) (109) by substituting the mean value (I) of the welding currents and a welding current correction amount ($\Delta I$) equivalent to the product of the calculated welding current error and a current gain into a calculation formula containing a first-degree polynomial (g'(I)) for the welding current and a welding current change amount ($\Delta I$) as variables. The wire feeding speed correction amount is input to a welding machine. If the welding voltage error falls outside an allowable range, the processor determines a power supply output correction amount ($\Delta U$) (115) by substituting the welding current correction amount ($\Delta I$) and a welding voltage correction amount ($\Delta V$) equivalent to the product of the calculated welding voltage error and a voltage gain into a calculation formula containing welding current and voltage charge amounts ($\Delta I$, $\Delta V$) as variables. The power supply output correction amount is input to the welding machine. The welding machine adjusts the wire feeding speed and power supply output, to rationalize the welding current and voltage.

2 Claims, 2 Drawing Sheets

ARC WELDING CURRENT AND VOLTAGE CONTROL METHOD

BACKGROUND OF THE INVENTION

1. Field of the Invention

The present invention relates to arc welding, and more particularly, to a control method capable of effecting satisfactory arc welding by automatically controlling arc welding current and voltage.

2. Description of the Related Art

In order to adjust arc welding current and voltage for satisfactory arc welding, trial welding is conventionally conducted by driving a welding machine with a tentatively set a power supply output and an electrode feeding speed. If the welding current and voltage measured during the trail welding are outside their respective allowable ranges, the trail welding is executed again after resetting the power supply output and the electrode feeding speed. Thus, according to the conventional method, the power supply output and the electrode feeding speed must be adjusted by the method of trial and error so that the welding current and voltage fall within their allowable ranges, while repeating the trail welding. Thus, the adjustment of the welding current and voltage requires labor.

SUMMARY OF THE INVENTION

The object of the present invention is to provide a control method capable of effecting satisfactory arc welding by automatically controlling arc welding current and voltage.

In order to achieve the above object, a welding current and voltage control method according to the present invention comprises the steps of: (a) detecting values of arc welding current and voltage; (b) calculating an error between the detected value of the arc welding current and a target value and an error between the detected value of the arc welding voltage and a target value; (c) calculating a correction amount of an electrode feeding speed of an arc welding machine in accordance with the calculated error of the arc welding current; and (d) calculating a correction amount of a power supply output of the arc welding machine in accordance with the respective calculated errors of the arc welding current and voltage.

According to the present invention, as described above, the respective correction amounts of the electrode feeding speed and the power supply output of the arc welding machine are calculated in accordance with the errors between the respective detected values and target values of the welding current and the power supply output can be corrected automatically to compensate the welding current and voltage errors, whereby the welding current and voltage can be automatically adjusted. Thus, there is no need of trail welding for the adjustment of the welding current and voltage, and the arc welding can always be effected satisfactorily.

DESCRIPTION OF THE PREFERRED EMBODIMENT

Figure 1:
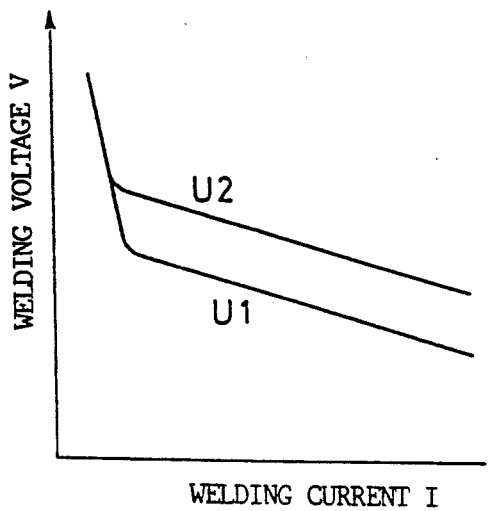
FIG. 1 is a graph illustrating, by way of example, the welding current-welding voltage characteristic of an arc welding machine.

As shown in FIG. 1, a welding voltage V of a typical arc welding machine drops straight and drastically as a welding current I increases in a first welding current region where the welding current I takes a small value. In a second (normal) welding current region where the welding current I takes a value greater than the value in the first welding current region, the welding voltage V drops straight in a rate of change lower than the rate of change in the first welding current region as the welding current I increases. The greater the power supply output of the welding machine, the higher the welding voltage. In FIG. 1, symbols U1 and U2 (>U1) designate values of the power supply output. Thus, the welding voltage V can be expressed as a function of the welding current I and the power supply output U, as is given by equation (1).

$$V = f(I, U). \tag{1}$$

Figure 2:
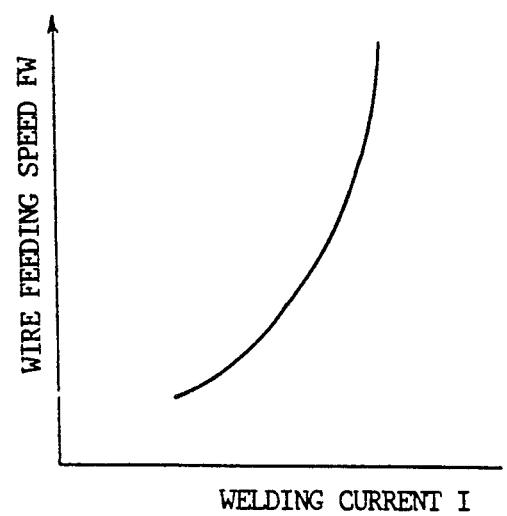
FIG. 2 is a graph illustrating, by way of example, the welding current-electrode feeding speed characteristic of the arc welding machine.

As shown in FIG. 2, the welding current I of the typical arc welding machine increases along a curve of second degree as an electrode feeding speed FW increases. Thus, the electrode feeding speed FW can be expressed as a function of the welding current I, as is given by equation (2).

$$FW = g(I). \tag{2}$$

The welding current-welding voltage characteristic and welding current-electrode feeding speed characteristic of the arc welding machine exemplarily illustrated in FIGS. 1 and 2 vary in dependence on welding conditions including the type of the electrode (physical properties of the electrode, such as electrode material, electrode diameter, etc.).

The present invention has been originated in consideration of the aforesaid characteristics of the arc welding machine, and is intended to correct the electrode feeding speed and power supply output of the arc welding machine, thereby rationalizing the arc welding current and voltage. The following is a description of the principle of an arc welding current and voltage control method according to the present invention.

First, totally differentiating equations (1) and (2), we obtain $$dV = (\delta f/\delta U) I \cdot dU + (\delta f/\delta I) U \cdot dI, \tag{3}$$

$$dFW = g'(I) dI. \tag{4}$$

Rearranging equations (3) and (4), we obtain $$\Delta U = \{\Delta V - (\delta f/\delta I) U \cdot I\}/(\delta f/\delta U) I, \tag{5}$$

$$\Delta FW = g'(I) \Delta I. \tag{6}$$

In the second welding current region of FIG. 1, the welding voltage linearly changes with a change of the welding current, so that the parameter $(\delta f/\delta I)U$ in equation (5), which is substantially constant, can be represented by a constant K1. Further, two welding current-welding voltage curves corresponding individually to two supply outputs U1 and U2 shown in FIG. 1 extend parallel to each other in the second welding current region. Accordingly, the welding voltage linearly changes with power supply output changes, so that the parameter $(\delta f/\delta U)I$ in equation (5), which is substantially constant, can be represented by a constant K2. After all, equation (5) can be approximately replaced by equation (7).

$$\Delta U = (\neq V - K1\Delta I)/K2. \qquad (7)$$

Approximately, moreover, the welding current-electrode feeding speed curve is formed of a curve of second degree, as shown in FIG. 2. Thus, the parameter $g'(I)$ in equation (6) can be approximately replaced by a first-degree curve $(aI+b)$, and equation (6) by equation (8).

$$\Delta FW = g'(I)\Delta I = (aI+b)\Delta I. \qquad (8)$$

After all, the arc welding current and voltage change by $\Delta I$ and $\Delta V$, respectively, if the power supply output and the electrode feeding speed change by $\Delta U$ and $\Delta FW$, respectively. Namely, the parameters $\Delta I$ and $\Delta V$ are regarded as required amounts of change of the welding current and voltage, and the welding current and voltage can be adjusted to proper values by changing the power supply output and the electrode feeding speed by the change amount $\Delta U$ and $\Delta FW$ which fulfill equations (7) and (8), respectively.

The following is a description of the arc welding current and voltage feedback control method according to one embodiment of the present invention.

Figure 3:
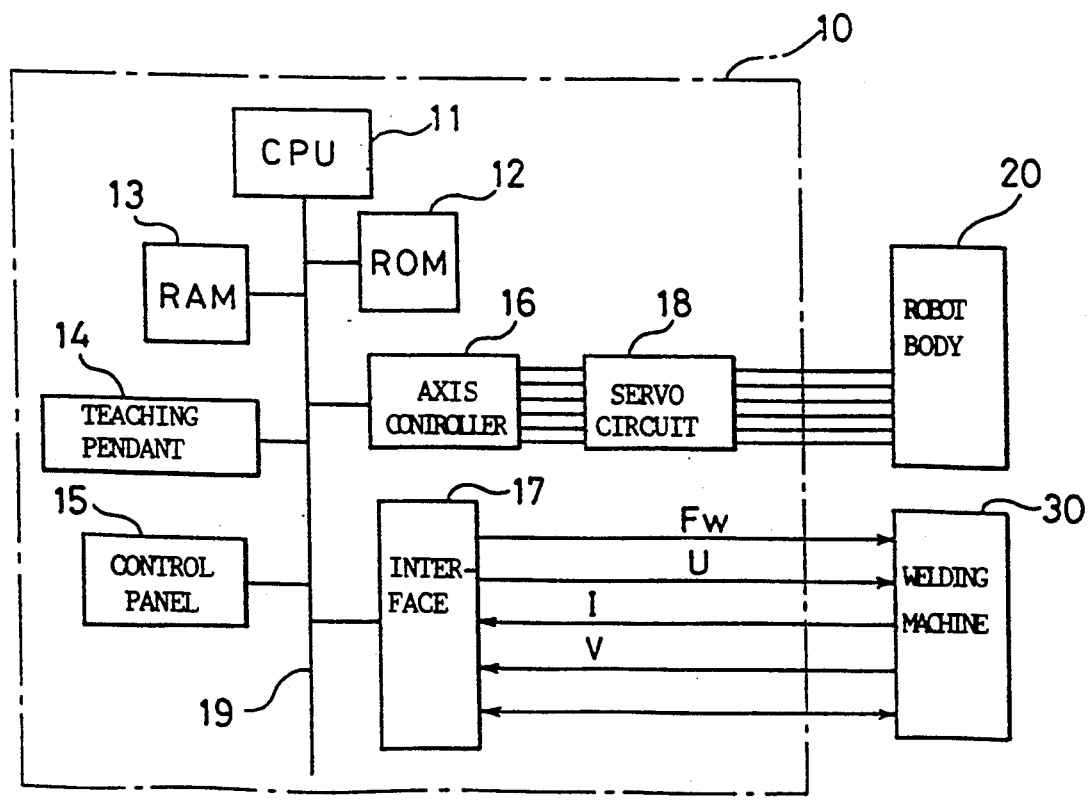
FIG. 3 is a schematic block diagram showing an arc welding robot for embodying an arc welding current and voltage feedback control method according to one embodiment of the present invention.

Referring to FIG. 3, a welding robot for embodying the method according to the one embodiment of the present invention, which serves for arc welding, including $CO_2$ welding, MIG welding, etc., comprises a control device 10 formed of, e.g., a numerical control device for controlling the drive of a robot body 20 provided with an arm having the distal end thereof on which a welding torch (not shown) of the welding machine 30 is fitted.

The numerical control device 10 comprises a processor (CPU) 11, a read-only memory (ROM) 12 loaded with a control program, and a random access memory (RAM) 13 for storing a teaching program for robot operation control and the result of arithmetic operation by means of the CPU 11. Further, the control device 10 comprises a teaching pendant 14 used to create a teaching program, a control panel 15 used for manual operation of the robot and data entry, an axis controller 16, an interface 17, and servo circuits 18. The aforesaid elements 12 to 16 and 17 are connected to the CPU 11 by means of busses 19. The servo circuits 18 are connected in control relation to the axis controller 16 and servomotors (not shown) for individual axes of the robot body 20. Further, the interface 17 is connected to a power source, an electrode (wire) feeding device, a welding current detector, and a welding voltage detector (none of which are shown) of the welding machine 30.

As mentioned before, the proper values (target values) of the welding current and voltage which enable satisfactory arc welding vary in dependence on the welding conditions including the type of the wire (not shown). Before the welding robot is operated in accordance with the method of the present embodiment, therefore, the proper values of the welding current and voltage corresponding to each set of the various welding conditions are experimentally determined in advance, for example. At the same time, the power supply output (output current and output voltage of the power source) and the wire feeding speed which allow the welding current and voltage of the proper values to be produced are previously determined. Based on the result of the experiment, moreover, those respective proper values of the parameters K1 and K2 associated with the power supply output and parameters a and b associated with the wire feeding speed which correspond to the various welding conditions are determined in advance.

The following is a description of the operation of the welding robot of FIG. 3.

An operator first determines the welding conditions including the type of the wire used in the arc welding, then manually enters various parameter values (target values of the welding current and voltage, tentative target values of the power supply output and the wire feeding speed, set values K1 and K2 of the first and second power supply output correction parameters, and set values a and b of the first and second wire feeding speed correction parameters) for the welding current and voltage control, which depend on the welding current and voltage into the control device 10 through the control panel 15, and further starts the welding robot.

In starting the robot, the CUP 11 of the control device 10 loads the RAM 13 with the manually entered parameter values, and then starts a control operation in accordance with the teaching program. More specifically, the CPU 11 starts position and attitude control for the welding torch by means of the axis controller 16, the servo circuits 18, and the servomotors for the individual axes, and delivers a welding command and the tentative target values of the power supply output and the wire feeding speed to the welding machine 30 via the interface 17. Further, the CPU 11 starts the welding current and voltage feedback control process of FIG. 4. This control process is periodically executed by means of the CPU 11. At the start of the control process, the CPU 11 resets each of stored values in first and second registers for storing cumulative detected values of the welding current and voltage and a counter value in a counter for counting the frequency of welding current and voltage direction to the value "0."

Figure 4:
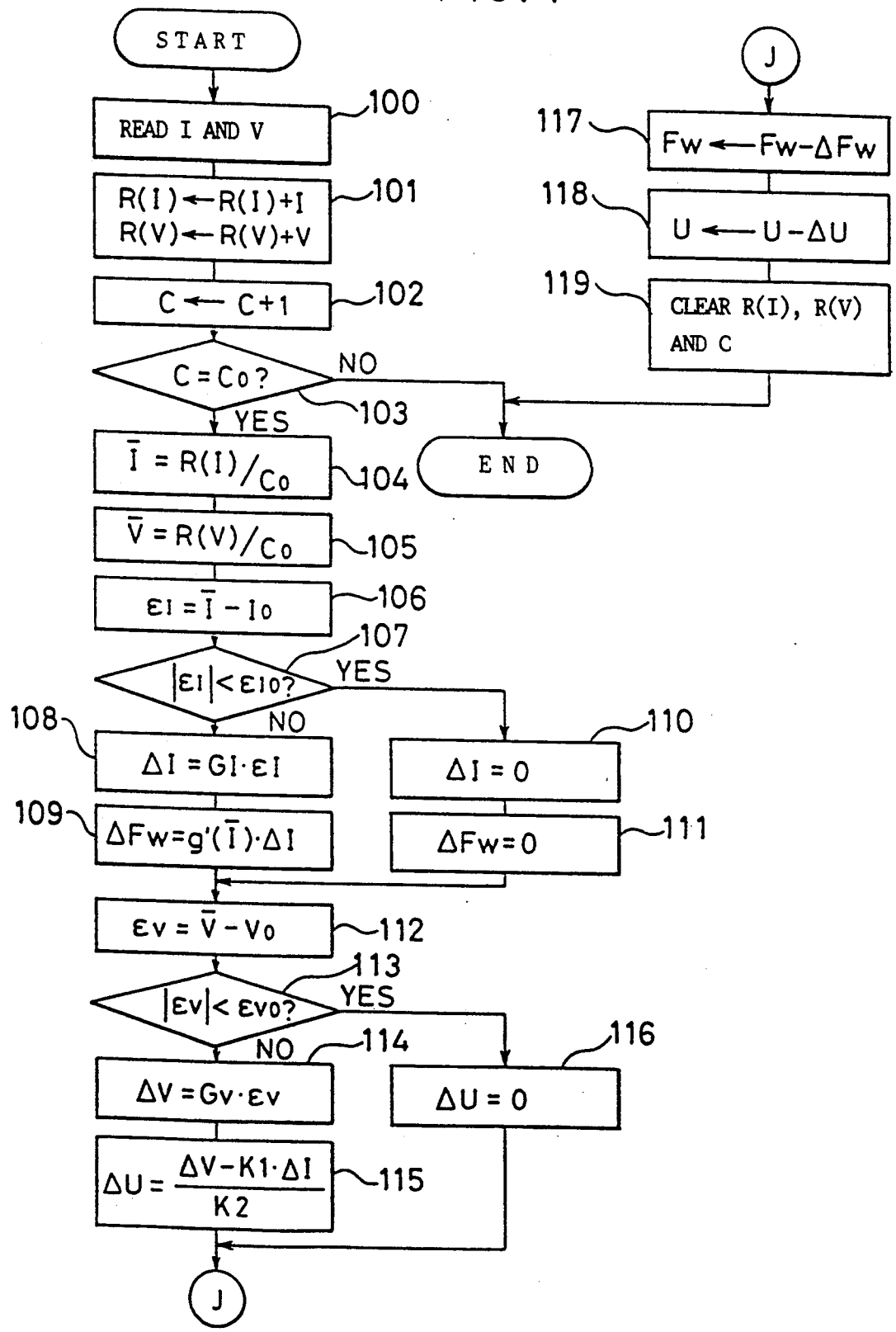
FIG. 4 is a flow chart showing a welding current and voltage feedback control process executed by means of the welding robot of FIG. 3.

In each processing period for the control process of FIG. 4, the CPU 11 reads detected values I and V of an actual welding current and a voltage from the detectors of the welding machine 30 through the interface 17 (Step 100), adds the detected values I and V to the stored values R(I) and R(V) in the first and second registers (Step 101), and increments the counter value C in the counter by "1" (Step 102). Then, the CPU 11 determines whether or not the counter value C is equal to a predetermined value C0 (Step 103). If the value C0 is not reached by the counter value C, the processing for the present processing period ends.

If it is concluded in Step S103 in a subsequent processing period that the predetermined value C0 is reached by the counter value C, the CPU 11 divides the cumulative detected values R(I) and R(V) of the actual welding currents and voltages stored individually in the first and second registers by the predetermined value C0, thereby calculating the mean values I and V of the actual welding currents and voltages (Steps 104 and 105). Then, the CPU 11 subtracts the target value I0 of the welding current from the mean value I of the actual welding currents, thereby calculating an error $\epsilon I$ of the welding current (Step 106), and determines whether or not the absolute value $|\epsilon I|$ of the error is smaller than a set value $\epsilon I0$, that is, whether or not the error $\epsilon I$ falls within an allowable range (Step 107). If the welding current error $\epsilon I$ is within the allowable range, each of the correction amount $\Delta I$ of the welding current and the correction amount $\Delta FW$ of the target value of the wire feeding speed is set to the value "0" (Steps 110 and 111). If the welding current error $\epsilon I$ is deviated from the allowable range, on the other hand, the welding current correction amount $\Delta I$ is calculated by multiplying the error $\epsilon I$ by a preset current gain GI (Step 108). As is given by equation (8), moreover, the correction amount $\Delta FW$ of the target value of the wire feeding speed is calculated by multiplying the sum of the set value b of the second wire feeding speed correction parameter and the product of the set value a of the first wire feeding speed correction parameter and the mean welding current value I by the correction amount $\Delta I$ (Step 109).

In Step 112 following Step 109 or 111, the CPU 11 calculates the error $\epsilon V$ of the welding voltage by subtracting the target value V0 of the welding current from the mean value V of the actual welding voltages. Then, a determination is made as to whether or not the absolute value $|\epsilon V|$ of the error is smaller than a set value $\epsilon V0$, i.e., as to whether or not the error $\epsilon V$ falls within an allowable range (Step 113). If the welding voltage error $\epsilon V$ is within the allowable range, the correction amount $\Delta U$ of the target value of the power supply output is set to the value "0" Step 116). If the welding voltage error $\epsilon V$ is deviated from the allowable range, on the other hand, the welding voltage correction amount $\Delta V$ is calculated by multiplying the error $\epsilon V$ by a preset voltage gain GV (Step 114). As is given by equation (7), moreover, the correction amount $\Delta U$ of the target value of the power supply output is calculated by subtracting the product of the welding current correction amount $\Delta I$, calculated in its corresponding one of Steps 109 and 111, and the set value K1 of the first power supply output correction parameter from the welding voltage correction amount $\Delta V$ calculated in Step 114, and by further dividing the subtraction result by the set value K2 of the second power supply output correction amount $\Delta V$ (Step 115).

Then, the CPU 11 calculates a new target value of the wire feeding speed by subtracting the correction amount $\Delta FW$ of the target value of the wire feeding speed, calculated in its corresponding one of Steps 109 and 111, from the present target value FW of the wire feeding speed, and delivers the updated target wire feeding speed value to the welding machine 30 (Step 117). Likewise, the CPU 11 calculates a new target value U of the power supply output by subtracting the correction amount $\Delta U$ of the target value of the power power supply output, calculated in its corresponding one of Steps 115 and 116, from the present target value U of the power supply output, and delivers the updated target power supply output value to the welding machine 30 (Step 118). Further, each of the stored values R(I) and R(V) in the first and second registers and the counter value C in the counter is reset to the value "0" (Step 119), whereupon the arc welding current and voltage control for the present processing period ends.

During the arc welding, the control process of FIG. 4 is periodically executed, and the target values of the wire feeding speed and the power supply output are updated or maintained so that the welding current and voltage errors are compensated. The welding machine 30 adjusts the wire feeding speed and the power supply output to the target values, so that the welding current and voltage are automatically controlled for the target values.

The present invention is not limited to the embodiment described above, and various modifications may be effected therein.

In the above embodiment, for example, the value of the variable $g'(I)$ in the wire feeding speed correction amount $\Delta FW(=b'(I) \cdot \Delta I)$ is calculated in accordance with the calculation formula $g'(I)=aI+b$ and using the mean value I the actual welding currents. Alternatively, however, values of the variable $g'(I)$ may be tabulated beforehand in a manner corresponding individually to a required number of welding current regions divided by welding current values, and a variable value corresponding to the mean welding current value I may be read out from the table.

We claim:

1. An arc welding current and voltage control method for use in a robot control system, comprising the steps of:

providing a welding current target value, a welding voltage target value, a power supply output target value, a wire feeding speed target value, a welding current error range and a welding voltage error range;

controlling a power source to output power in accordance with the power supply output target value;

controlling a wire feeding device to feed wire at a wire feeding speed in accordance with the wire feeding speed target value;

detecting an actual welding current and an actual welding voltage;

calculating an actual welding current error, which is the difference between the actual welding current and the welding current target value;

calculating an actual welding voltage error, which is the difference between the actual welding voltage and the welding voltage target value;

calculating a power supply correction value based on the actual welding voltage error and the actual welding current error if the actual welding voltage error is outside of the welding voltage error range;

calculating a wire feeding speed correction value based on the actual welding current error if the actual welding current error is outside of the welding current error range;

supplying the power supply correction value to the power source, which adjusts power supply output in accordance with the power supply correction value; and supplying the wire feeding speed correction value to the wire feeding device, which adjusts the wire feeding speed in accordance with the wire feeding speed correction value.

2. An arc welding current and voltage control method for use in a robot control system, comprising the steps of:

inputting a welding current target value, a welding voltage target value, a power supply output target value, a wire feeding speed target value, a welding current error range and a welding voltage error range into a control device having a memory and a CPU, which has a first register, a second register and a counter, wherein the welding current target value, the welding voltage target value, the power supply output target value, the wire feeding speed target value, the welding current error range and the welding voltage error range are stored in the memory of the control device;

retrieving the power supply output target value from memory and transmitting the power supply output target value to a power source, which outputs power in accordance with the power supply output target value;

retrieving the wire feeding speed target value from memory and transmitting the wire feeding speed target value to a wire feeding device, which feeds wire at a wire feeding speed in accordance with the wire feeding speed target value;

detecting an actual welding current, which is detected by a welding current detector;

detecting an actual welding voltage, which is detected by a voltage detector;

reading the actual welding current from the current detector and adding the actual welding current to value stored in the first register;

reading the actual welding voltage from the voltage detector and adding the actual welding voltage to value stored in the second register;

incrementing value stored in the counter;

repeating the detection and the addition of actual welding current and actual welding voltage to the respective registers as well as the incrementation of the counter until value stored in the counter equals a predetermined counter value;

determining an actual welding current means value based on a summation of the actual welding current detected by the current detector and stored in the first register if the value stored in the counter equals the predetermined counter value;

determining an actual welding voltage mean value detected by the welding voltage detector and stored in the second register if the value stored in the counter equals the predetermined counter value;

retrieving the welding current target value and determining the difference between the actual welding current mean value and the welding current target value to determine an actual welding current error;

retrieving the welding voltage target value from memory and determining the difference between the actual welding voltage mean value and the welding voltage target value to determine an actual welding voltage error;

retreiving the welding current error range from memory and determining whether the actual welding current error falls within the welding current error range;

retrieving the welding voltage error range from memory and determining whether the actual welding voltage error falls within the welding voltage error range;

calculating a wire feeding speed correction value if the actual welding current error does not fall within the welding current error range;

calculating a power supply correction value if the actual welding voltage error does not fall within the welding voltage error range;

adjusting the power supply output by the power supply correction value if a power supply correction value is calculated; and adjusting the wire feeding speed of the wire feeding device if a wire feeding speed correction value is calculated.

* * * * *